United States Patent [19]

Wagner

[11] 4,113,462
[45] Sep. 12, 1978

[54] PROMOTION OF PLANT GROWTH WITH COMPOSITIONS CONTAINING A DITHIOCARBAMIC ACID DERIVATIVE

[75] Inventor: Romeo Barrick Wagner, Wilmington, Del.

[73] Assignee: Hercules Incorporated, Wilmington, Del.

[21] Appl. No.: 789,303

[22] Filed: Apr. 20, 1977

[51] Int. Cl.$^2$ ............................ C05C 3/00; C05C 9/00
[52] U.S. Cl. ............................................ 71/7; 71/27; 71/64 SC; 71/100; 71/30
[58] Field of Search ............ 71/100, 64 F, 30, 64 SC, 71/27, 11, 7, 51, 61

[56] References Cited

U.S. PATENT DOCUMENTS

| | | | |
|---|---|---|---|
| 3,135,594 | 6/1964 | Goring | 71/11 |
| 3,256,083 | 6/1966 | Goring | 71/7 X |
| 3,561,949 | 2/1971 | Doyle | 71/100 |

FOREIGN PATENT DOCUMENTS

| | | | |
|---|---|---|---|
| 7,206,376 | 3/1968 | Japan | 71/64 F |
| 7,222,777 | 4/1969 | Japan | 71/64 F |

OTHER PUBLICATIONS

Jaques et al; Can. J. Soil Sci. vol. 39; pp. 235–243 (1959).
Bundy et al; Soil Sci. Soc. Amer. Proc. vol. 37; pp. 396–398 (1973).
Brenner et al; Soil Biol. Biochem. vol. 6; pp. 161–165 (1974).
Ashworth et al; Chemistry and Industry; 9/6/75; pp. 749–750.
British Provisional 23340 (ICI); 5/28/1975.

Primary Examiner—Kenneth M. Schor
Attorney, Agent, or Firm—John W. Whitson

[57] ABSTRACT

The invention relates to a process and compositions for promoting plant growth. The compositions contain a dithiocarbamic acid derivative such as ammonium dithiocarbamate and preferably also contain a reduced nitrogen fertilizer such as ammonium nitrate.

8 Claims, No Drawings

PROMOTION OF PLANT GROWTH WITH COMPOSITIONS CONTAINING A DITHIOCARBAMIC ACID DERIVATIVE

This invention relates to the promotion of plant growth. More particularly, the invention concerns a process and a composition for inhibiting the nitrification of ammonium nitrogen in soil.

It has been recognized for many years that the efficiency of nitrogen fertilizers could be considerably improved by reducing the loss of nitrate nitrogen caused by denitrification and leaching processes. Because of this, a great deal of effort was expended in the evaluation of numerous organic compounds to determine their capability for slowing down the rate at which ammonium nitrogen is converted to nitrate nitrogen. What actually was involved in these evaluations was the action of the organic compound to reduce the population of the Nitrosomonas bacteria which effect oxidation of the ammonium ion to nitrite ion, which then is changed to the nitrate ion by a different species of bacteria, Nitrobacter. Thus, a reduced Nitrosomonas population results in less nitrification.

The foregoing investigations resulted in the discovery of a number of effective nitrification inhibitors, such as 2-chloro-6-(trichloromethyl)pyridine (U.S. Pat. No. 3,135,594 to Dow Chemical Company). However, these inhibitors are comparatively expensive. More recently, it has been established that carbon disulfide, a comparatively inexpensive chemical, also is effective as a nitrification inhibitor (Ashworth et al, "Chemistry and Industry", Sept. 6, 1975, page 749), but this compound is objectionable because of its disagreeable odor, high volatility, flammability and toxicity on inhalation. Thus, the need has remained for a nitrification inhibitor which is effective, inexpensive and readily handled and used.

Now, in accordance with this invention, it has been found that plant growth may be improved by impregnating the soil below the soil surface in a plant growing area with certain carbon disulfide derivatives, namely, ammonium dithiocarbamate and dimethylammonium dimethyldithiocarbamate, in an amount corresponding to from about three to about thirty pounds per acre. Preferably, the amount of these dithiocarbamates applied to the soil will be in the range of from about three to about ten pounds per acre. In conjunction with these specified amounts of the dithiocarbamates, it is customary for the soil also to contain fertilizer nitrogen in an amount corresponding to about one hundred pounds per acre.

The dithiocarbamate compounds of this invention are prepared by the reaction of ammonia or dimethylamine with carbon disulfide under anhydrous conditions. Ordinarily, the reaction is carried out in an organic solvent as a diluent. Representative solvents are, for example, anhydrous ethanol, diethyl ether, ethyl acetate and isopropyl acetate. The temperature during the reaction generally is maintained within the range of from about 10° to about 30° C.

Ammonium dithiocarbamate, for example, may be prepared by passing ammonia into a stirred solution of carbon disulfide in isopropyl acetate at a temperature in the range of 20° to 30° C. The ammonium dithiocarbamate precipitates in the reaction mixture as a light yellow, crystalline product and, upon completion of the reaction, the resulting slurry is filtered and the crystalline product is washed with petroleum ether, hexane or diethyl ether and dried at room temperature. The purity of the product is 95% or better, and the yield usually is in the range of about 90 to about 95%. Recrystallization of the product from water by addition of an ethanol: diethyl ether mixture (6:1 by volume) to effect precipitation of the ammonium dithiocarbamate gives a white crystalline solid having a purity greater than 98%. Dimethylammonium dimethyldithiocarbamate may be prepared in a similar manner.

Ammonium dithiocarbamate slowly decomposes in air at room temperature to form hydrogen sulfide, sulfur, ammonium thiocyanate and ammonium sulfide, but it is comparatively stable at 0° C. Dimethylammonium dimethyldithiocarbamate is quite stable at either temperature. Both compounds are stable in solution in water, concentrated aqueous ammonia and anhydrous ammonia. This stability in solution facilitates the application of the dithiocarbamates as nitrification inhibitors and also the formulation of fertilizer compositions containing them.

The dithiocarbamates of this invention may be distributed in a plant growing area by impregnating the soil below the soil surface with the compounds either prior to, simultaneously with or subsequent to the administration of a nitrogen fertilizer. The compounds may be so distributed in unmodified form or in conjunction with an inert solid carrier or an organic nitrogen fertilizer, such as the condensation product of urea and formaldehyde. However, the compounds preferably are distributed in solution in water or anhydrous ammonia, and most preferably in solution in conjunction with a reduced nitrogen fertilizer such as ammonia, an ammonium salt or urea. The concentration of the dithiocarbamate compound in such solutions may vary considerably, depending on whether the solution is a treating composition or a concentrate composition.

Thus, the amount of the dithiocarbamate may range from about 0.25 to about 50% by weight of the composition. In treating compositions containing a reduced nitrogen fertilizer, it is desirable that the dithiocarbamate be present in an amount of at least 0.5% by weight based on the weight of the nitrogen present in the fertilizer as reduced nitrogen. Thus, when the fertilizer composition contains both reduced nitrogen and other forms of nitrogen, as in the case of ammonium nitrate fertilizer compositions, the amount of dithiocarbamate is based on the weight of nitrogen present in the ammonium component.

Representative fertilizer compositions in accordance with this invention are those commercially available aqueous solutions of reduced nitrogen fertilizers to which have been added either, or both, of ammonium dithiocarbamate or dimethylammonium dimethyldithiocarbamate. Thus, in addition to the dithiocarbamate, these solutions will contain, for example, ammonia in concentrations of from about 20 to about 30% by weight, or urea in concentrations up to about 80% by weight, or urea and ammonium nitrate in amounts providing between about 20 and about 30% total nitrogen by weight, or ammonium nitrate and ammonia, with or without urea, in a wide variety of proportions wherein the total nitrogen is in the range of from about 20 to about 50% by weight.

In the urea-ammonium nitrate solutions mentioned above, about half of the total nitrogen is usually provided by the urea, and the remainder is approximately equally divided between ammonium and nitrate nitrogen. Additional fertilizer compositions in accordance with this invention are those solutions of ammonium dithiocarbamate and dimethylammonium dimethyldithiocarbamate in aqueous ammonium sulfate or aqueous ammonium phosphate, and also in anhydrous ammonia. In the anhydrous ammonia solutions, the concentration of the dithiocarbamate may be from about 0.25 to about 50% by weight, preferably from about 0.5 to about 20% by weight.

Having generally described the invention, the following examples illustrate specific embodiments thereof. The examples were carried out using standard greenhouse procedures.

EXAMPLE 1

Ammonium sulfate was mechanically mixed with soil at the rate of 100 pounds of nitrogen per three million pounds of soil, or approximately 100 pounds of nitrogen per acre. The mixture of soil and fertilizer was placed in five-inch clay pots and sprayed on the surface with a solution prepared by dissolving one gram of ammonium dithiocarbamate in 20 grams of acetone and diluting the resulting acetone solution with water up to 133 milliliters. The mixture of soil and fertilizer in six pots was sprayed with the ammonium dithiocarbamate solution at the rate of three pounds per acre, and the mixture in another six pots was sprayed at the rate of ten pounds per acre. The contents of each pot then was dumped, thoroughly mixed and replaced in the pot. The twelve pots of soil prepared in this manner were each planted with six wheat seeds and held in the greenhouse for eight weeks. The plants were then removed from the pots, washed free of soil and weighed.

The above procedure was repeated except to use dimethylammonium dimethyldithiocarbamate instead of the ammonium dithiocarbamate. It also was essentially repeated except to use an aqueous emulsion of carbon disulfide in place of the dilute acetone/water solution of ammonium dithiocarbamate. Six pots containing only the mixture of soil and ammonium sulfate were planted and processed as controls. The results obtained in these tests are given in Table 1.

Table 1

| Compound Tested | Percent Increase In Plant Weight (Total Of Six Replicates) vs. Control | |
|---|---|---|
| | Three Pounds/ Acre | Ten Pounds/ Acre |
| Ammonium Dithiocarbamate | 9.0 | 28.0 |
| Dimethylammonium Dimethyldithiocarbamate | 5.0 | 24.0 |
| Carbon Disulfide | 1.3 | 8.0 |

EXAMPLE 2

The fertilizer used in this example was anhydrous ammonia, and the mixture of soil and ammonia was prepared in a plastic bag by injecting a weighed amount of ammonia, as a gas, into the soil through a glass tube, after which the tube was withdrawn and the bag shaken to effect adequate mixing of the soil and fertilizer. The treated soil contained 100 pounds of nitrogen per three million pounds of soil. From this point on, the procedure of Example 1 was followed except to use four-inch clay pots, ammonium dithiocarbamate and carbon disulfide as the test compounds, eight barley seeds per pot and a greenhouse holding period of three months. The results of these tests are shown in Table 2.

Table 2

| Compound Tested | Percent Increase In Plant Weight (Total Of Six Replicates) vs. Control | |
|---|---|---|
| | Three Pounds/ Acre | Ten Pounds/ Acre |
| Ammonium Dithiocarbamate | 35.0 | 26.0 |
| Carbon Disulfide | 0 | 0 |

EXAMPLE 3

The preceding example was duplicated except for use of one tomato transplant per pot in place of the barley seeds, and a greenhouse holding period of two months. The data from these tests are given in Table 3.

Table 3

| Compound Tested | Percent Increase In Plant Weight (Total Of Six Replicates) vs. Control | |
|---|---|---|
| | Three Pounds/ Acre | Ten Pounds/ Acre |
| Ammonium Dithiocarbamate | 0 | 19.0 |
| Carbon Disulfide | 5.0 | 0 |

It is apparent from the foregoing examples that the ammonium dithiocarbamate and dimethylammonium dimethyldithiocarbamate compounds of this invention gave improved plant growth in comparison to the fertilized soil controls. It is also apparent that these compounds generally provided a very noticeable improvement in comparison to carbon disulfide.

What I claim and desire to protect by Letters Patent is:

1. A method for improving plant growth in soil containing fertilizer nitrogen in an amount corresponding to about one hundred pounds per acre, said method comprising impregnating said soil below the soil surface in a plant growing area with at least one nitrification inhibitor compound selected from the group consisting of ammonium dithiocarbamate and dimethylammonium dimethyldithiocarbamate in an amount corresponding to from about three to about thirty pounds per acre where said amount is effective to inhibit nitrification of the reduced nitrogen in the soil.

2. The method according to claim 1 wherein the compound is ammonium dithiocarbamate.

3. The method according to claim 1 wherein the compound is dimethylammonium dimethyldithiocarbamate.

4. The method according to claim 1 wherein the compound is applied in conjunction with at least one reduced nitrogen fertilizer selected from the group consisting of ammonia, ammonium salts and urea.

5. A fertilizer composition for improving plant growth comprising at least one reduced nitrogen fertilizer selected from the group consisting of ammonia, ammonium salts and urea and at least one nitrification inhibitor compound selected from the group consisting of ammonium dithiocarbamate and dimethylammonium dimethyldithiocarbamate, the amount of said compound being from about 0.25 to about 50% by weight of said composition and also being at least 0.5% by weight based on the weight of the reduced nitrogen present in said reduced nitrogen fertilizer.

6. The fertilizer composition according to claim 5 wherein the compound is ammonium dithiocarbamate.

7. The fertilizer composition according to claim 6 wherein the reduced nitrogen fertilizer is ammonia.

8. The fertilizer composition according to claim 6 wherein the reduced nitrogen fertilizer is urea.

* * * * *